(12) United States Patent
Shiffman et al.

(10) Patent No.: US 6,424,732 B1
(45) Date of Patent: Jul. 23, 2002

(54) OBJECT SEGREGATION IN IMAGES

(75) Inventors: Smadar Shiffman, Stanford; Sandy Napel, Menlo Park, both of CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/203,299

(22) Filed: Dec. 1, 1998

(51) Int. Cl.[7] .................................................. G06K 9/00

(52) U.S. Cl. .................... 382/131; 382/128; 250/455

(58) Field of Search ............................. 382/131, 128, 382/132; 250/455

(56) References Cited

U.S. PATENT DOCUMENTS

| | | | | |
|---|---|---|---|---|
| 5,457,754 A | * | 10/1995 | Han et al. ................. | 382/128 |
| 5,560,360 A | * | 10/1996 | Filler et al. ............... | 128/653 |
| 5,742,325 A | * | 4/1998 | Curry et al. ............... | 347/251 |
| 5,768,406 A | * | 6/1998 | AbdelMotaleb ........... | 382/132 |
| 5,790,692 A | * | 8/1998 | Price et al. ................ | 382/133 |
| 6,175,652 B1 | * | 1/2001 | Jacobson ................... | 382/181 |
| 6,210,401 B1 | * | 4/2001 | Lai ............................. | 606/12 |
| 6,222,173 B1 | * | 4/2001 | Meeussen et al. ......... | 250/208 |

* cited by examiner

Primary Examiner—Leo Boudreau
Assistant Examiner—Barry Choobin
(74) Attorney, Agent, or Firm—Lumen Intellectual Property Services

(57) ABSTRACT

Segregating object images from an image is accomplished by a method that includes intensity thresholding and generating isolabel contour lines at image regions of constant image intensity. The shapes of the isolabel contours are quantified by calculating turning angle sequences. The turning angle sequences of contours compared to discern which contours to group and label as belonging to an object image. The method uses information obtained from intensity thresholding in combination with the inherent shapes of the object images to group isolabel contours and segregate the object images. The method is general and is used for segregating object images from continues images such as photographs and film. The method is extended to 3-dimensional image volumes and further includes modeling cross sections of object images as ellipses. An overlap criteria is used to group cross sectional object images in an images volume from 2-dimensional slices of the image volume. The method has applications in medical imaging and is particularly useful for segregating vessel tissue from an image volume, wherein the volume is constructed from digitized data acquisitions obtained using ultrasound, CT, and MR imaging techniques.

16 Claims, 14 Drawing Sheets

OBJECT SEGREGATION IN IMAGES

FIELD OF THE INVENTION

This invention relates generally to segregating selected object images from an image. In particular this invention relates to segregating selected object images from images containing a collection of object images to remove background artifacts and image leaks that result from closely spaced object images-and to view selected objects image independently.

BACKGROUND

Image segregation herein means defining the boundaries of an object image from an image in order to separate the object image from noise and other object images. Segregating an object image from 2-dimensional images involves defining the boundaries of the image that correspond to the object. Defining the boundaries of an object image can be difficult, especially if the object image is blurred or is positioned in an area of the image where there is a collection of other object images that leak or bleed into each other. Separating an object image form a more complex image or defining the boundaries of an object image within an image is useful for the identification of the object that has been imaged. For example, the authenticity of a blurred photograph could be ascertained if the true shape of the i objects in the photograph can be discerned. Furthermore, image segregation can be used to support automated indexing and retrieval of photographs from large photograph collections based on the photographs' contents, or could facilitate identification of bank robbers from poor quality video images. Of all the possible applications of image segregation, one of more useful applications has been in the area of medical imaging.

Computed Tomography (CT) is an important non-evasive method to image tissue volumes for medical diagnoses and therapy planning. The general concept of CT imaging involves collecting multiple stepwise images of a circumference of a tissue slice. A 2-dimensional image is reconstructed by back projection of the detected signals densities on to the imaged slice. Any number of 2-dimensional slices are acquired and can be stacked to generate a 3-dimensional image volume representing the imaged tissue.

Virtually all volume imaging methods use digitizing image data. Digitizing the image data allows a computer system to manipulate the data and stack the 2-dimensional images into a 3-dimensional image volume. Once the image volume is constructed the volume can be edited by any number of methods. There are several image acquisition methods, such as ultrasound and Magnetic Resonance (MR), for generating image volumes that use the same basic principle of generating 2-dimensional digitized images and stacking them to generate a 3-dimensional image volume which then can be manipulated either sectional or as an image volume by a computer.

It is often beneficial to selectively view a particular feature or object image in the imaged volume by a process of image segregation. For example, vascular tissue is difficult to view in the complex surrounding of an image containing large organs and bone tissue. There are many exemplar methods for image segregation; for a review see Pal, N. R., and Pal, S. K. A review on image segmentation techniques, Pattern Recognition, Volume 26(9), pp. 1277–1294. Image segregation in a three dimensional volume involves two basic steps. Firstly, at least one two dimensional cross section needs to be edited to select the image that is to be segmented. For example, a region of pixels containing Voxels of the object image of interest can be traced and the pixels outside of the traced region can have the image intensity set to zero. Prior art segregation methods involve manual tracing of the object image to be segmented. The procedure of manual tracing is very time consuming even for experienced radiologists and the results are not consistent from operator to operator. Image thresholding is another common technique for segmenting object images from an image. The basic principle is to assign image thresholds that correspond to the imaged object to be segmented. However, object images that appear in medical images often have overlapping intensity distribution and thresholding can result in the misclassification of Voxels. Users usually distinguish between good and inadequate thresholds by the shape of the regions whose Voxels intensities are contained within the thresholds and a priori knowledge of the shape of the object imaged. Deciding what is a good intensity threshold can be time consuming and can give unreasonable results because of overlapping intensities.

The second step to image segregation in three dimensions involves identifying and grouping the object images from each consecutive 2-dimensional cross section that belongs to the object to be segmented based on grouping criteria. For example the grouping criteria could be that object images that have a similar image intensity and position. Generally, all the method for image segregation in 2-dimensions can be extended to three dimensions but still have the same limitations and difficulties.

What is needed is a method for object image segregation that can be automated, does not require hand tracing and does not require a priori knowledge of shapes of the objects imaged. Further there is a need for a method that can segregate complex structures such as vascular tissue images. The method should reduce the time involve in the segregation, reduce artifacts in the image caused by leaks from surrounding object and be readily applied to image volumes.

OBJECTS AND ADVANTAGES

It is a primary object of this invention to provide a method for segregating object images from images, whereby the segregation method requires no a priori knowledge about the shapes of the object imaged or the object images. The method is general and can be used for segregating object images from continues images such as photographs and film It is a further object of this invention to provide a method for segregating object images from an image using information obtained from intensity thresholding and the inherent shapes of the object images. The method generates segregated images of object that accurately represent the features of the object imaged.

It is a specific object of this invention to provide a method of segregating object images from images, wherein the method does not require manual tracing. The method eliminates the inconstancies that occur from operator tracing, reduces the time of segregating the object images, is not specific or sensitive to the image acquisition mode and can be fully automated.

It is a more specific object of the invention to provide a method of segregating complex object images from images. The method has applications in medical imaging and is particularly useful for segregating vessel tissue from an image volume, wherein the image volume is constructed from digitized data acquisitions obtained ultrasound, CT, and MR imaging techniques.

SUMMARY

The objects of the invention are obtained providing a method for segmenting complex object images, such as arterial structures, from an image volume. The image volume is preferably obtained by acquiring 2-dimensional images that represent imaged slices of an image volume. The method is most useful in the field of medical imaging where the 2-dimensional images are digitized images obtained from CT, MR or ultrasound acquisition data and are comprised of Voxels. While it is not required, in the preferred embodiment of this invention the 2-dimensional images are segmented to define the salient regions of the images containing the object images to be segmented prior to constructing a 3-dimensional image volume.

There are any number of methods to segment object images from 2-dimensional images using intensity thresholding, but the method of this invention uses the combinations of intensity thresholding and intrinsic imaged shapes in order to segment object images. The method can be completely automated and does not require prior knowledge of the shapes of the objects. imaged.

An intensity threshold or range of intensities is predetermined to give a sufficient number of divisions of intensities depending on the range of image intensities contained within the images. Isolabel contours are then generated around object images, whereby the spatial separations of the contours are determined by the intensity thresholds. The isolabel contours follow a path of substantially constant intensity and enclose Voxels within regions that result from the intensity thresholds.

The Voxels between contours are then assigned a constant intensity value or label. Image intensity can be represented by a numerical intensity, image density, image brightness and image color; in the case of digitized images, image densities or gray scales are the most common representation of intensity. To decide which contours belong to which object image the shapes of the isolabel contours are compared. It is generally preferable to compare the contours starting from the inner portion of an object image and moving outward, however it is not required. When the shape of a contour deviates substantially from the shape of other contours, the contour with the deviating shape can be considered as not belonging to the same object image as the other contours and the Voxels within the contour are labeled accordingly. For example, if a group of isolabel contours are generated around an approximately spherical object, starting from the inward region of the object outward, when isolabel contours deviate substantially from spherical they can be considered as not belonging to the same group of contours. The contours that deviate substantially from groups of contours around an object image to be segmented, can be labeled by setting the Voxels between the deviating contours to zero and the contours that have substantially similar shape are labeled as belonging to the same object image. In comparing the shapes of the contours, it is beneficial to compare shapes in the order of increased intensity values or labels and to maintain a hierarchical representation of the contours to improve the efficiency of the comparison. The method requires no prior knowledge of the shapes of the object images and uses the combination of intensity thresholding and shape comparison to identify the regions of image intensity that belong to an object image. The method is general and can be applied to continuos intensity images such as photographs and films.

Once the 2-dimensional images are obtained, the images are stored in a computer that is capable of constructing a 3-dimensional image volume. The volume that is generated does not connect or group object images from the 2-dimensional images sufficiently to segment a particular object image from the volume, especially when the object image is a complex object or is contained in a complex set of 2-dimensional images. To allow such object images to be segmented the imaged volume can be divided into a set of parallel adjacent 2-dimensional planes in any direction. Images of the objects contained within the image volume are then viewed as cross sections of the object image as it passes through the 2-dimensional planes. Isolabel contours are then generated from cross sections of the object images in each 2-dimensional plane or sets of planes taken from the 3-dimensional image volume.

A preferred method for generating isolabel contours is to choose a set of control points within each image intensity threshold of a 2-dimensional plane and connect the set of control points with a cubic spline approximation line. The process is iterated by choosing (n) sets of control points within the image intensity threshold to generated (n) pseudo isolabel contours. The (n) pseudo isolabel contours are then averaged to generate an isolabel contour that represents the shape of a cross section of an object image in a 2-dimensional plane. The isolabel contours generated by this method can be described by a mathematical function that is used to describe the shape of the cross sections. In order to describe the shapes of the isolabel contours, a turning angle sequence for each isolabel contour is calculated. The turning angle sequences of the isolabel contours are compared to determine which contours belong to the group of contours associated with the objects to be segmented from the image volume. Contours within a 2-dimensional plane that have turning angle sequences that deviate substantially from the group of contours associated with the object image to be segments are labeled as not belonging to that object image. Regions of the image contained between the contours that exhibit sufficient shape deviation may be edited out of the imaged volume by setting the image intensity to zero.

Once the contours have been generated by thresholding, the shapes of the contours have been compared, and Voxels have been labeled for a set of adjacent 2-dimensional planes of the imaged volume, the cross sections of object images are examined between adjacent planes in order to group inter-planar cross sections of object images. To decide if cross sections of object images between adjacent 2-dimensional planes belong to the same object image, an overlap criteria is applied in the direction normal to the 2-dimensional planes.

The model that is applied to analyze the overlap criteria is that object images are represented by compositions of cylinders within the 3-dimensional volume. If object image are appropriately modeled as cylinders within the image volume, then cross sections of object images in 2-dimensional planes can be modeled as ellipses.

Calculating the overlaps of cross sectional segments of object images from sets of 2-dimensional adjacent planes of the imaged volume is accomplished by prescribing a functions that substantially encloses the area of cross-sections. Preferably, this is accomplished by describing cross sections as enclosed by contours that have been generated by the method described above. The contour function for a given cross section is decomposed into two orthogonal projections in the plane of the cross section. By computing the first harmonic coefficients of the Fourier series for this function a new function that approximates the shapes of the cross sections as ellipse is generated based on the contour function. The ellipses in the adjacent parallel 2-dimensional planes are then examined for their overlap in the direction normal to the 2-dimensional planes.

As a first overlap criteria to decide which ellipses to evaluate the minor-axes of the ellipses are compared. If minor-axes of ellipses in adjacent parallel 2-dimensional planes are substantially the same length and have substantially the same orientation they potentially belong to the same object image and should be evaluated further. If this condition is not met the ellipses may be considered as not belonging to the same object image. A second overlap criteria involves evaluating the overlap integrals of the ellipses in the direction normal to 2-dimensional planes. If the overlap integral is not sufficient the cross sections are label as not belonging to same object image or can be edited out of the image volume.

To further check and see if the model is correct, the overlap integral values from the ellipses are compared to the overlap valued of the functions or contours from which the ellipse where derived. In order to segment complex object images from an imaged volume it is preferred to extent the method described above to three orthogonal directions.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
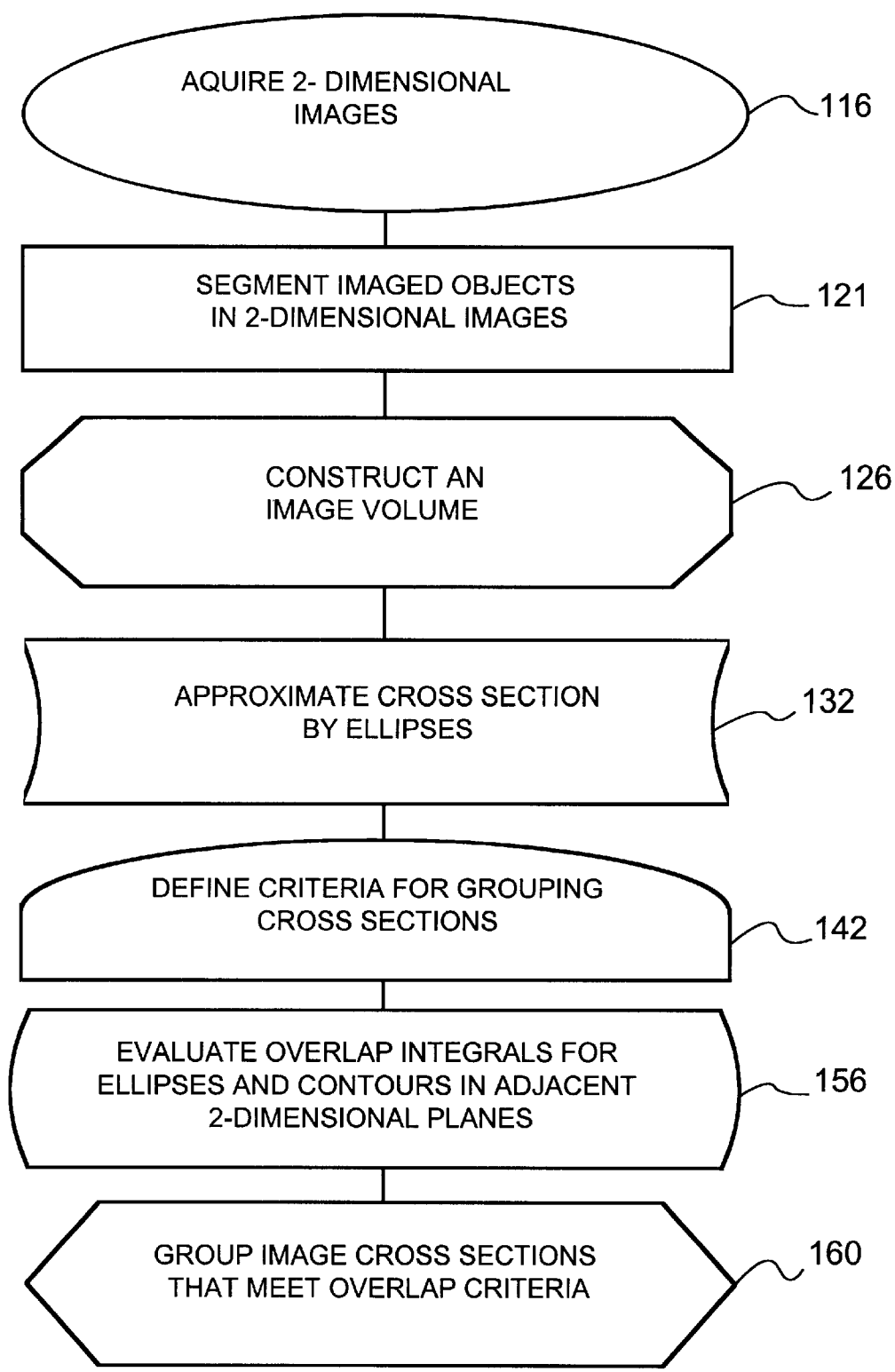
FIG. 1 is a flow diagram for the method of segregating an object image from a 3-dimensional image volume.

FIG. 1, is generalized flow chart for the method of segmenting in an object image from an image volume. Two dimensional digitized images are acquired 116 preferably from CT, MR or ultrasound acquisition data. The 2-dimensional images are comprised of Voxels and the salient regions of the images containing the object images to be segmented are selected.

Figure 2:
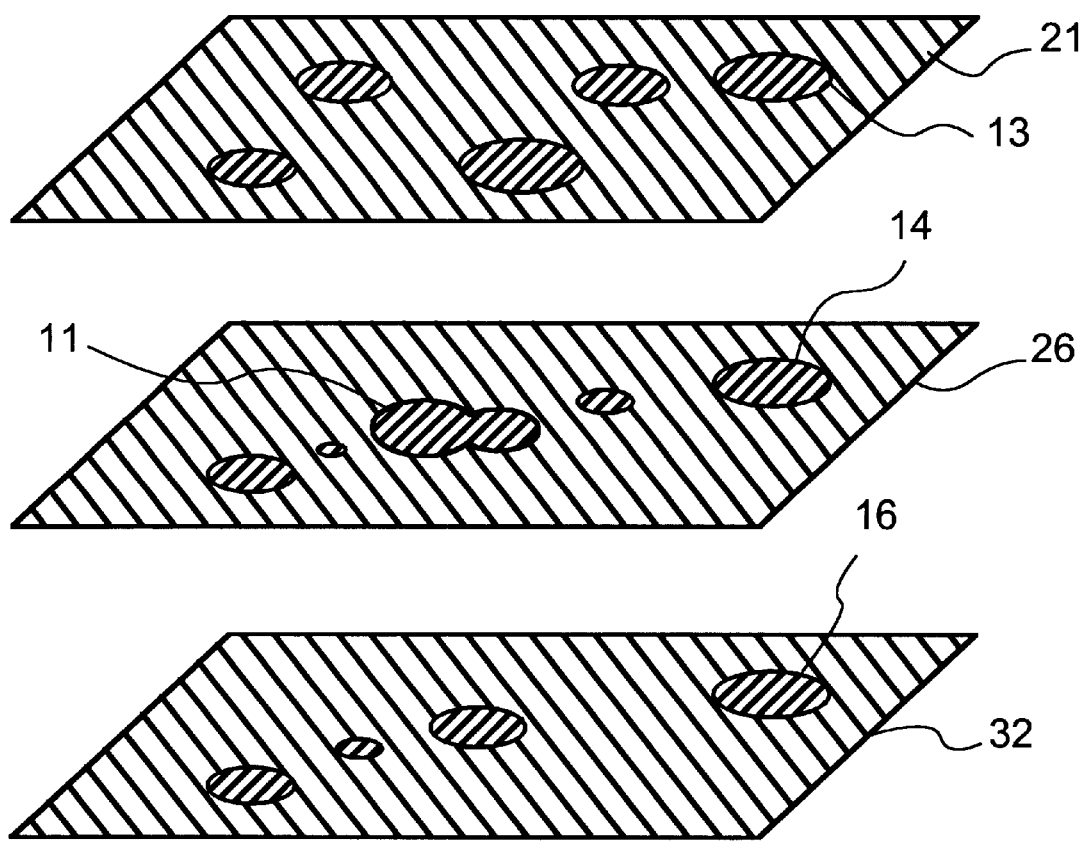
FIG. 2 shows three 2-dimensional images that represent images acquired by standard techniques; the cross section of the object images are represented by the darker hatching.

Referring to FIG. 2, three 2-dimensional images 21, 26, and 32 are viewed showing cross sections of objects images. It should be noted that 2-dimensional images acquired are generally comprised of Voxels (small image volumes) and thus the images are not strictly planes but rather have some depth and, therefore, the image volume that is generated will have more continuous representation of object images; these figures are constructed for illustrative purposes only. It is clear by observation that the cross sections corresponding to 13, 14 and 16 overlap each other and have similar shapes and therefore, likely belong to the same group of object images. However, it is not clear from FIG. 2 which cross sections should be grouped for other object images. For example, the cross section 11 in the image 26 does not appear to have any sister cross section in the images 21 and 32.

Figure 3:
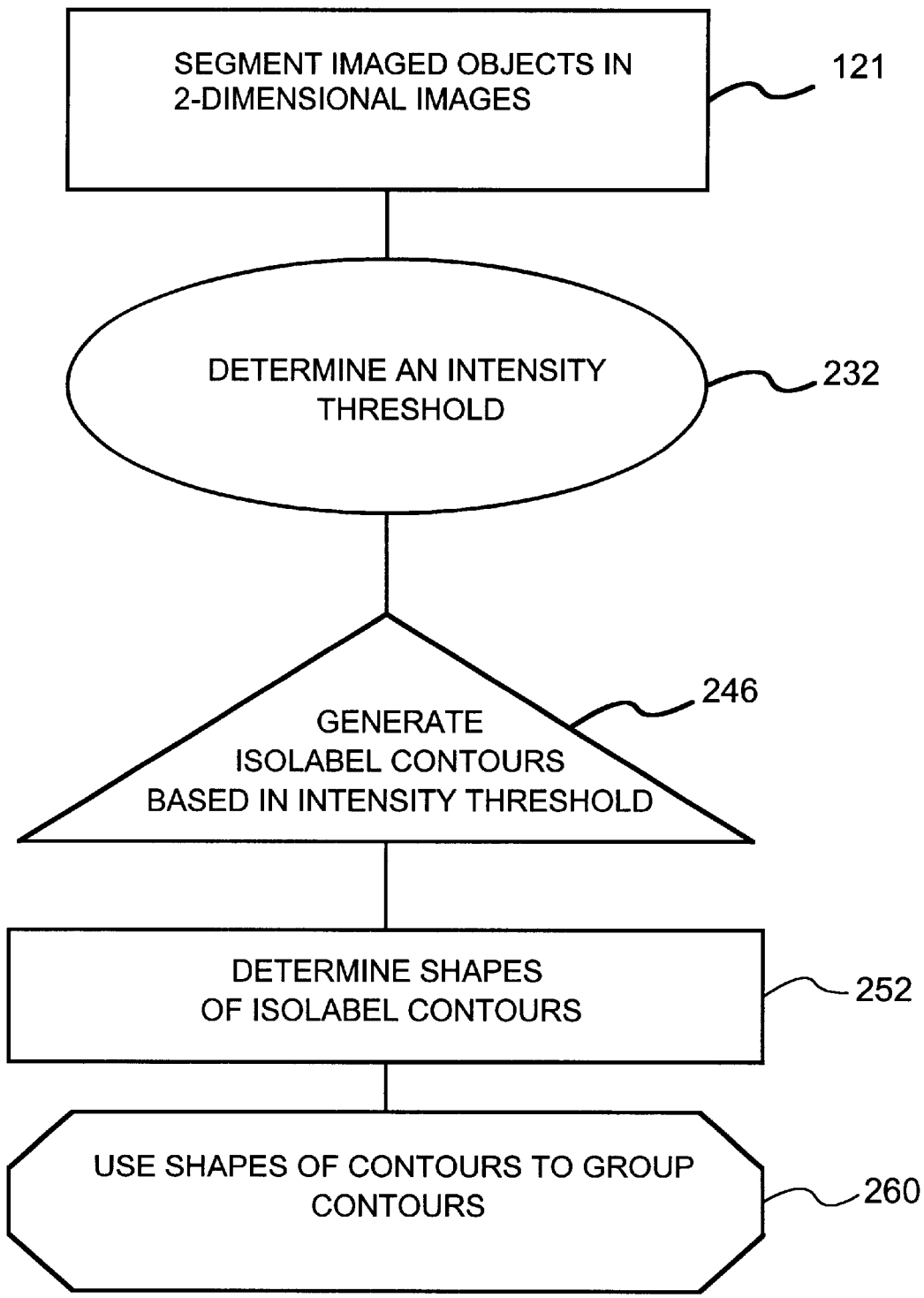
FIG. 3 is a flow diagram for segmenting object images from 2-dimensional images.

Referring to FIG. 3, the 2-dimensional images are segmented 121 by first determining an image intensity threshold 232.

Figure 4:
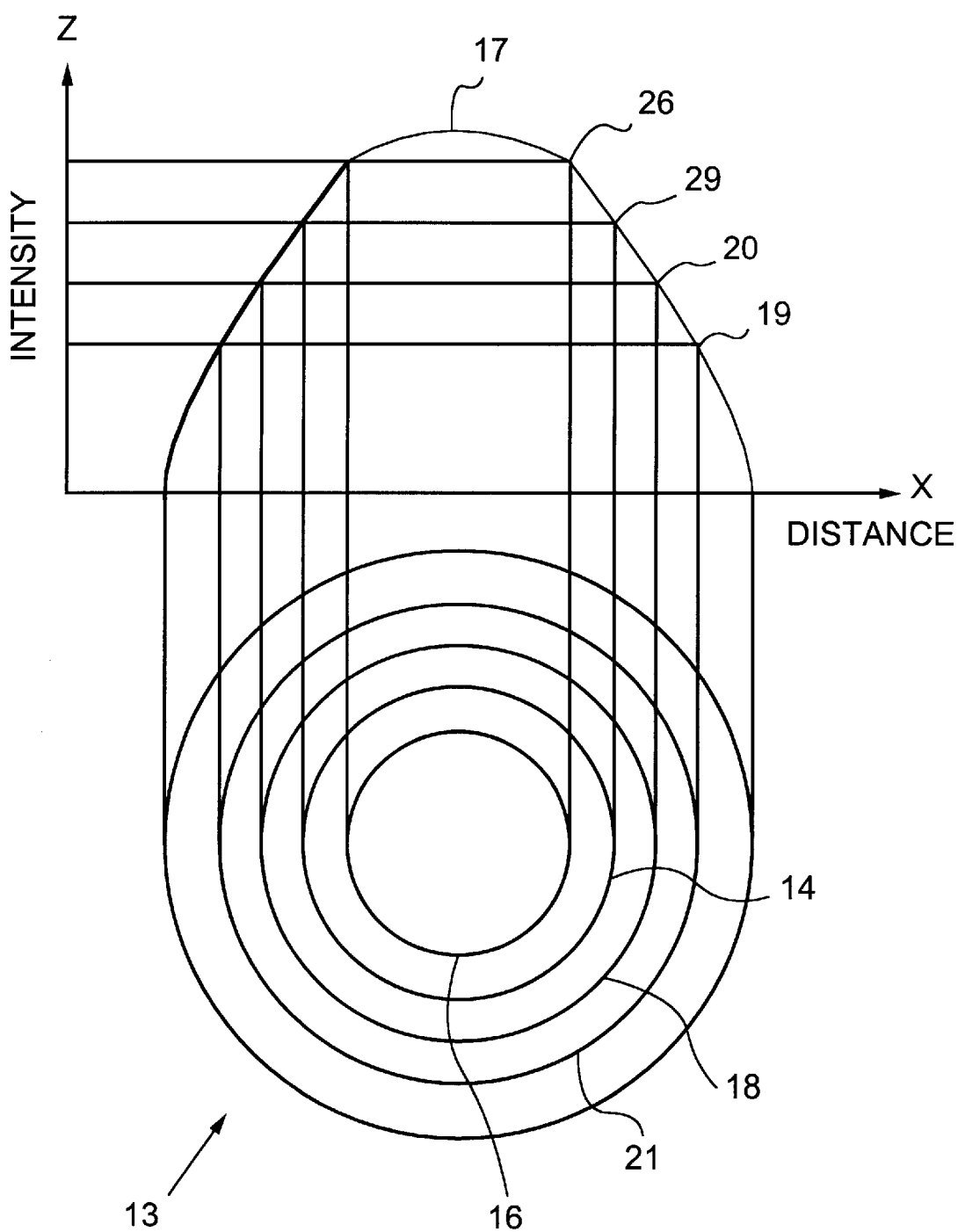
FIG. 4 shows a graphical representation of intensity thresholding for a 2-dimensional section of a cylindrical object.

FIG. 4 illustrates intensity thresholding for a cylindrical object image 13. The intensity versus distance curve 17 is plotted and projected over an image of the object 13. Intensity thresholding is visualized by dividing the z intensity axis into equal segments or thresholds 26, 29, 20, 19 and projecting the intensities at threshold increments back on the distance axis which correspond to concentric distances on the image 16, 14, 18 and 21, respectively.

Referring again to FIG. 3, the next step to segmenting object images from 2-dimensional images is to extract isolabel contours 246. Extracting isolabel contours involves tracking coordinates of the outermost Voxels whose intensities are within the range specified by two thresholds. Each isolabel contour encloses a is region of the image. For example, the concentric circles shown in FIG. 4 are isolabel contours. The regions of the image that are between isolabel contours can be assigned a common intensity label. Choosing an intensity threshold depends on the ranges of intensities in the image and the application at hand. A smaller spacing of intensity thresholds will result in a larger number of contours and a smaller probability of error. Complex multi-level thresholding may be applied to this method without loss of generality, whereby different threshold spacing is applied to different intensity ranges, and the corresponding isolabel contours are extracted. Intensity thresholding can be applied to any intensity category that can represent different regions of an images such as numerical intensity, image density, image brightness and image color. For the purpose of medical imaging, the intensities correspond to gray scales of the Voxels in a digitized image.

Again referring to FIG. 4, when extracting the isolabel contours it is preferable to extract a terminal contour 16 first and then to extract additional contours 14, 18 and 21 outward, wherein a terminal isolabel contour is a contour that encloses no other contours. One reason that this order of extracting isolabel contours is preferred is because often there is a region at the interior of the object image with relatively constant intensity and that will result in a contour shape that is similar to the object imaged.

Figure 5A:
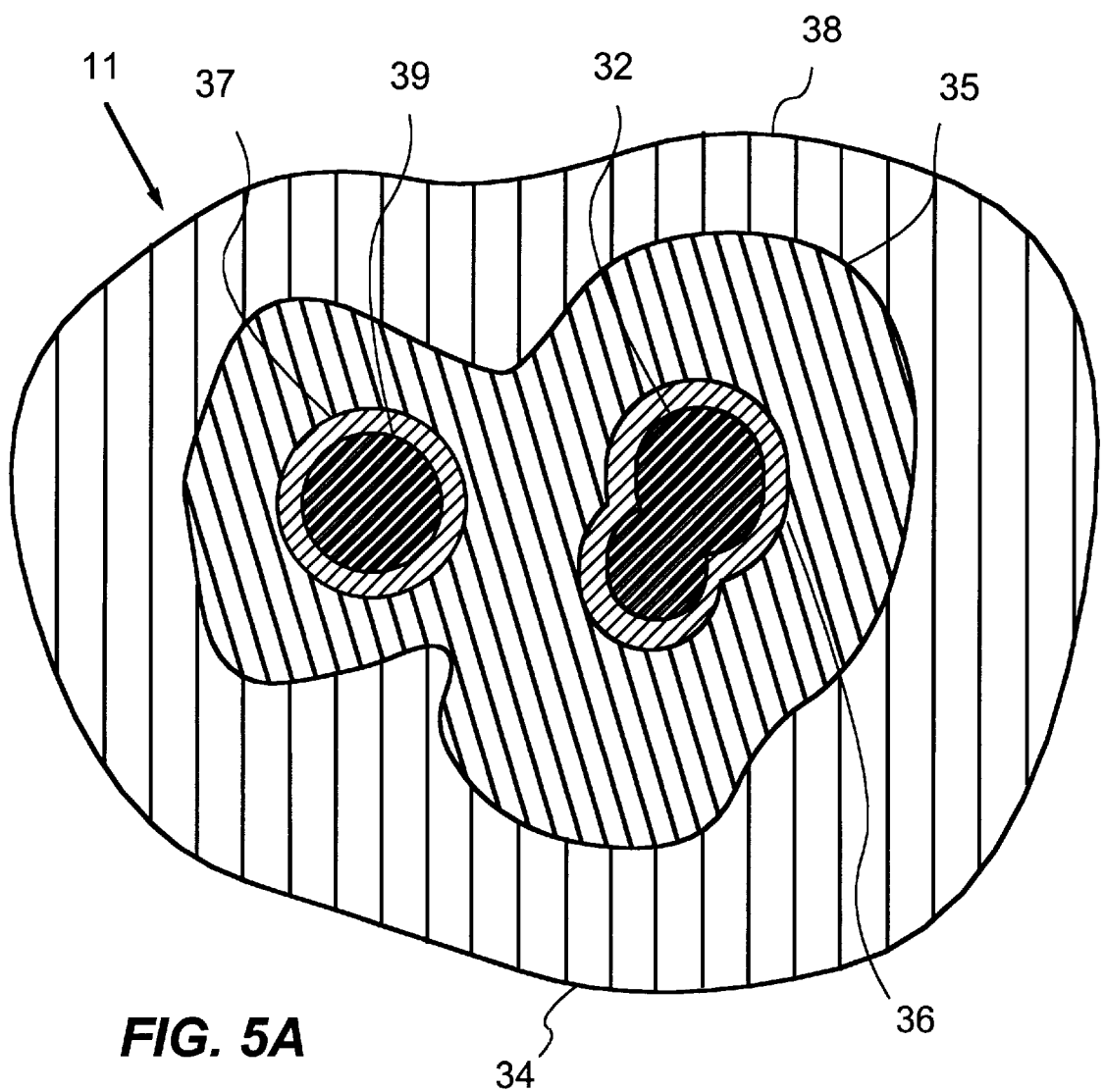
FIG. 5a shows a cross section of an object image from a 2-dimensional plane with isolabel contours generated around two closely spaced object.

FIG. 5a displays isolabel contours for two closely spaced image objects. FIG. 5a illustrates intensity thresholding that has been applied to the region of the image containing the cross-sections of these object images. Terminal contours 39 and 32 can be seen to reasonably represent the shape of the object images, however they do not necessarily represent reasonable spatial boundaries of the object images. It is reasonable that the isolabel contours 37 and 36 more closely represent the boundaries of the object images.

Figure 5B:
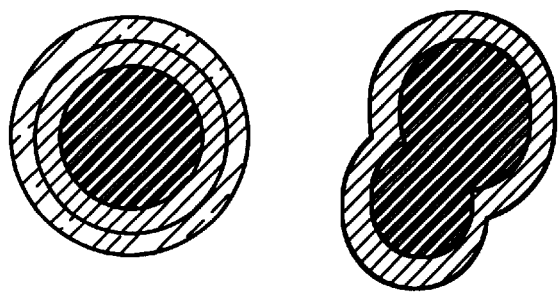
FIG. 5b shows grouped isolabel contours around two closely spaced object based on shape similarity.

Referring to FIG. 3 to determine which isolabel contours to group together, the shapes of the contours are determined 252. The shapes of the contours are compared 260 and when the shapes of the contours are substantially similar they are grouped together or labeled as belonging to the same object image. When the shapes of the contour deviates substantially from the shapes of other contours or of groups of contours, those contours can be considered as not belonging to the same object image and are labeled accordingly. Referring again to FIG. 5a, the contour 35, clearly deviates from the shapes of either contour 37 or 36 and, therefore, the portion of the image contained between contours 37, 36 and 35 should not be grouped or labeled with contours 37 or 36. Based on a visual analysis of the isolabel contour shapes, an appropriate grouping of the contours is 37 with 39 and 36 with 32. Referring to FIG. 5b, the contours 34 and 38 are labeled as not belonging to the object images and have been labeled with zero intensity.

Figure 6:
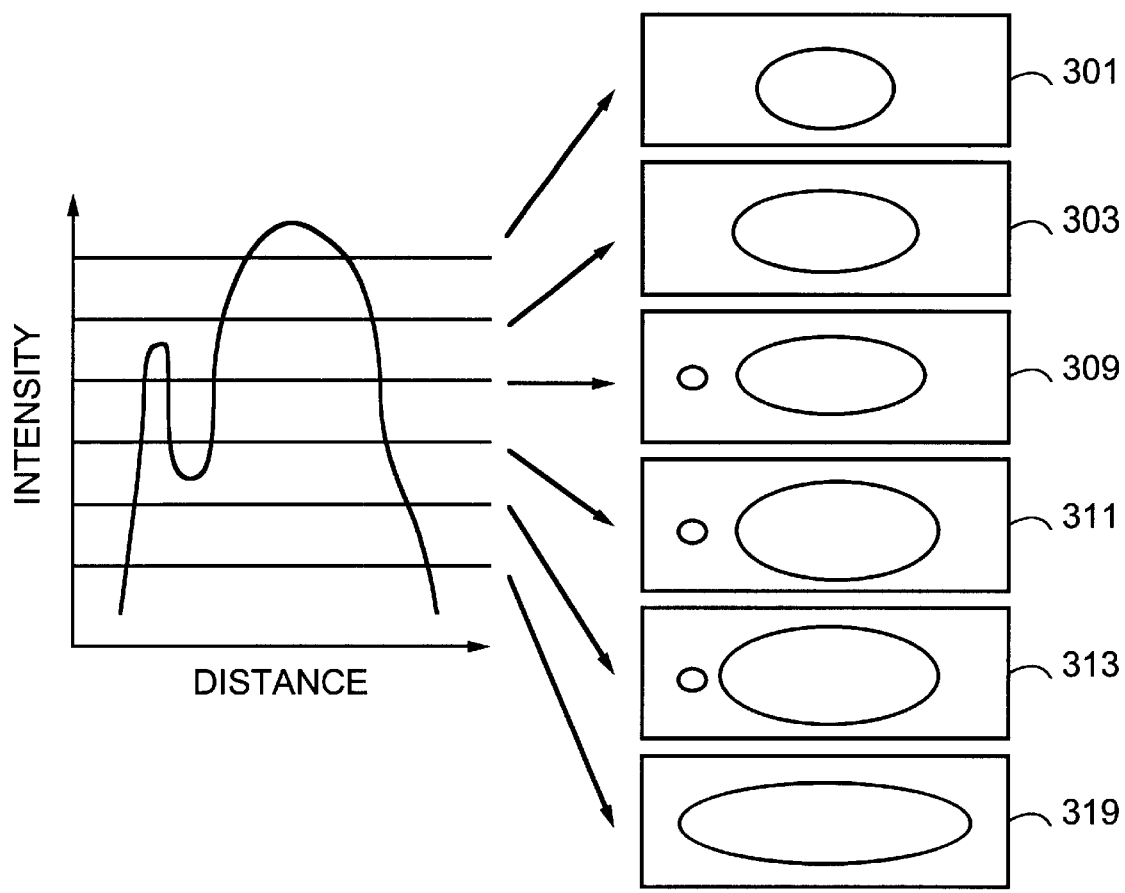
FIG. 6 is a graphical representation of the preferred order for comparing the shapes of isolabel contours.

For this method, shapes can be determined visually but are preferably compared by calculating a turning angle sequence for each isolabel contour. The turning angles of contours are readily calculated by first fitting a spline approximation line to the contour. The turning angle sequences are then compared for each pair of isolabel contours. When the sequences differs substantially then the contours are labeled as not belonging to the same object. It is preferable to compare the shapes of contours in similar intensity ranges, but it is not required. The terminal isolabel contours can equally be compared with the outer most contours, or a complex sequence of comparisons may be appropriate depending on the application at hand. Referring to FIG. 6, when comparing the shapes of the contours, it is beneficial to compare shapes in the order of increased intensity values or labels, to ensure that we consider contours in a fixed direction with respect to the object's center, so that we are guaranteed to find the boundary of the object. Thus the preferred order of comparison for the isolabel contour illustrated in FIG. 6 is 301, 303, 309, 311, 313 and 319. The method described above for segmenting object images from 2-dimensional images requires no a priori knowledge of the shapes of the objects or of the object images and uses the combination of intensity thresholding and shape comparison to identify the regions of image intensity that belong to an object image. The method is general an can be applied to continues intensity images such as photographs and films.

Figure 7:
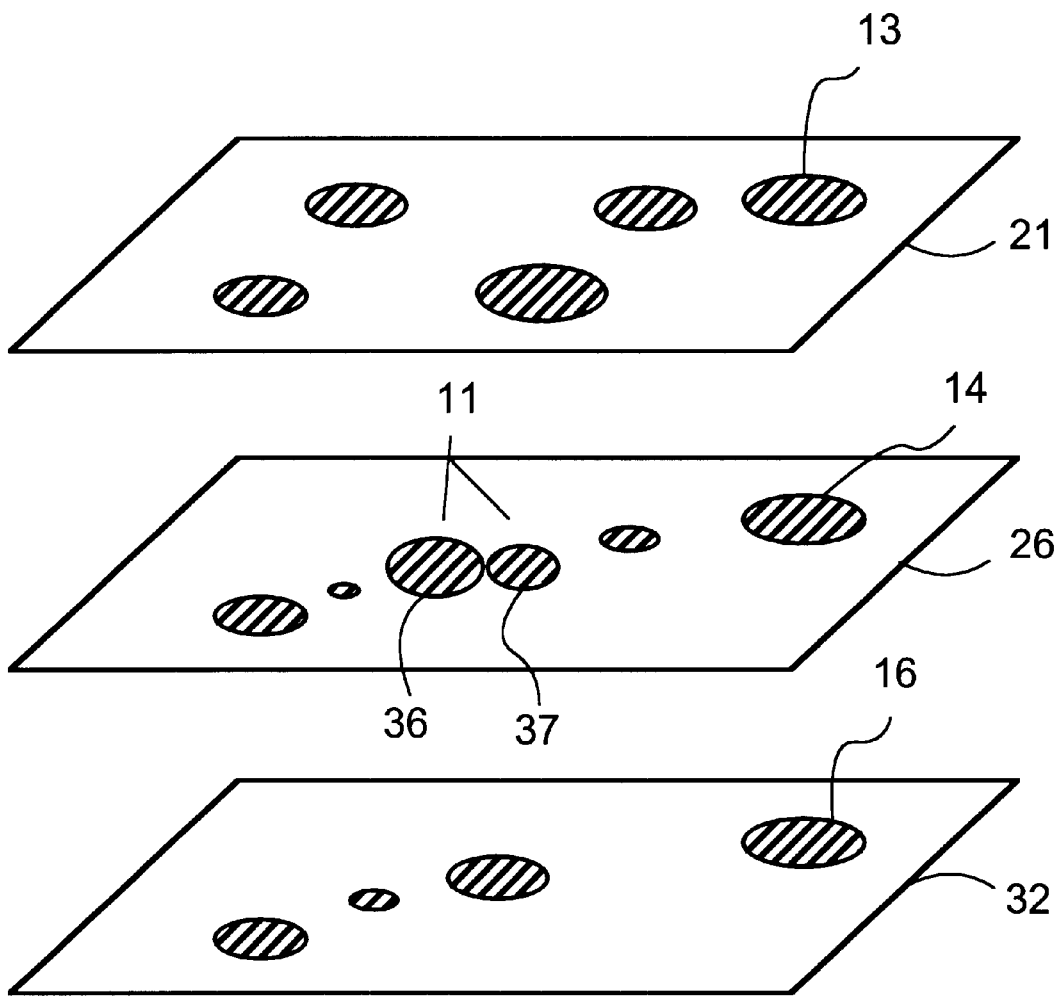
FIG. 7 shows three 2-dimensional images that represent images acquired by standard techniques after object images have been segmented with cross sections of object images represented by hatches.

FIG. 7 illustrates the set of three 2-dimensional images 21, 26 and 32 that have been segmented to define the regions of the images that contain cross sections of object images to be segmented. For illustration, regions that were not enclosed by contours with similar shape have been edited out of the images. The cross section 11 from FIG. 2 is now resolve into two separate cross-sections defined by the contours 36 and 37 in FIG. 7.

Figure 8:
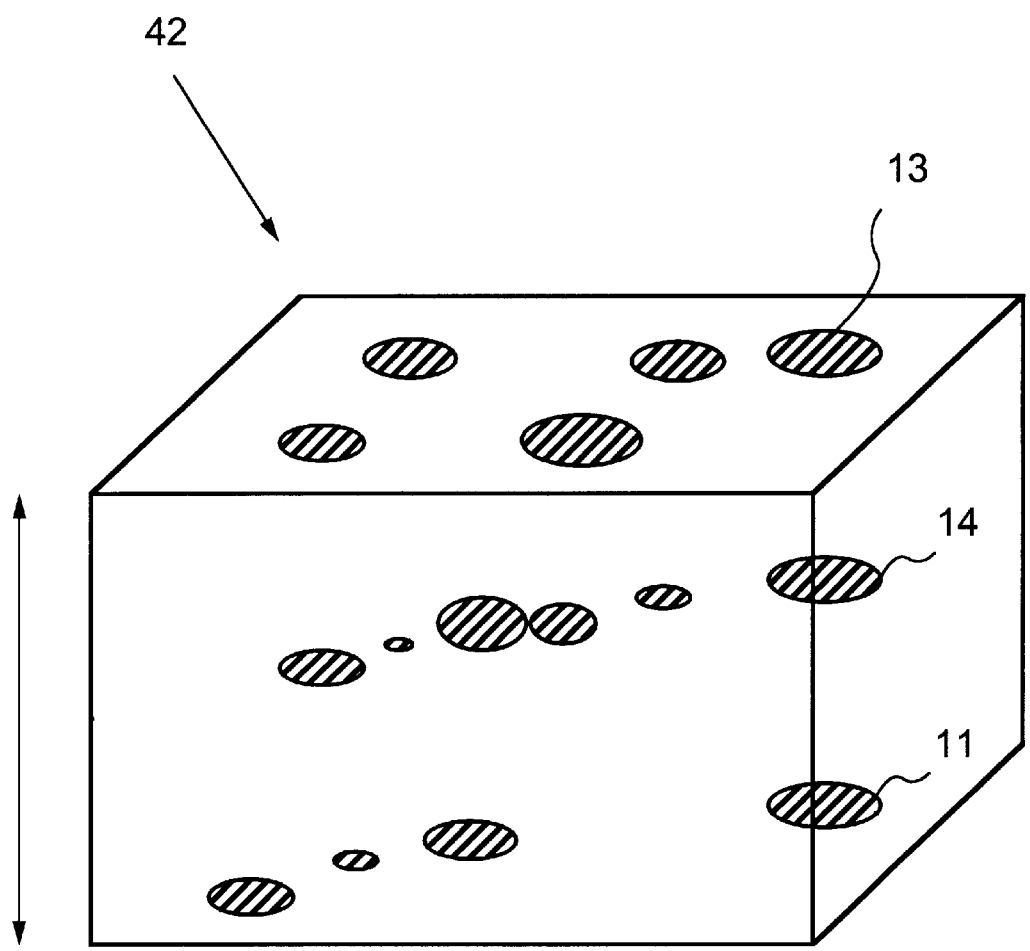
FIG. 8 shows a 3-dimensional volume constructed from three 2-dimensional images after object images have been segmented.

Now referring to FIG. 8, once the 2-dimensional images are obtained, and segmented, the images are stored in a computer that is capable of constructing a 3-dimensional image volume 42. The image volume 42 is constructed from the 2-dimensional images 21, 26 and 32 that have been undergone segregation described above, however, the method of grouping or labeling cross sectional object images in an image volume is general and segregation prior to constructing the image volume 42 from the 2-dimensional images 21, 26 and 32 is not required. Visual inspection again shows that the cross sections 13, 14 and 11 likely belong to the same object image, but the connectivity or is grouping of other cross sectional object images in the image volume 42 is not readily made by inspection.

Figure 9:
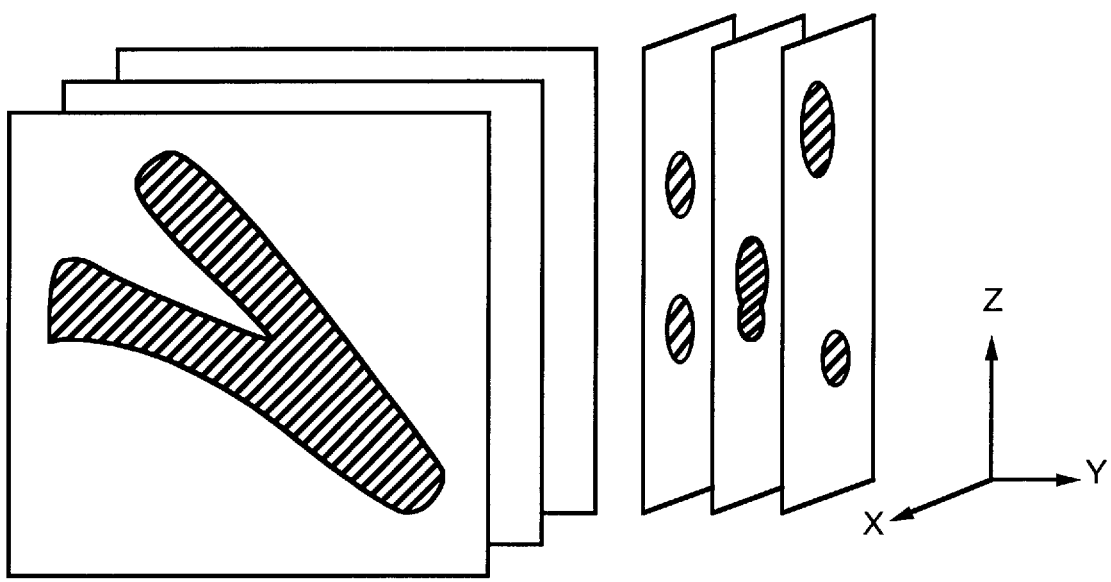
FIG. 9 shows a cross sections of a branching structure in three orthogonal directions of parallel 2-dimensional planes of an image volume.
Figure 9:
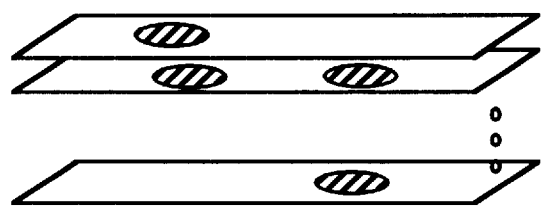

Now referring to FIG. 9, once the image volume is generated and the image volume can be sliced into parallel 2-dimensional planes in any direction. FIG. 9 shows the cross sectional object images of a forked structure for parallel 2-dimensional planes of the image volume in 3 orthogonal directions. For segmenting complex object images from an image volume it is preferential to divide the image volume into parallel 2-dimensional planes in 3-orthogonal directions and apply the segmentation method described below to the three sets of planes.

To decide if cross sections of object images between adjacent 2-dimensional planes belong to the same object image, an overlap criteria is applied in the direction normal to the 2-dimensional planes. The criteria that is used is based on a model that assumes that object images are represented by compositions of cylinders within the 3-dimensional volume. If an object image is cylindrical, then cross sections of the object images in 2-dimensional planes through the image volume can be modeled as ellipses.

Figure 10:
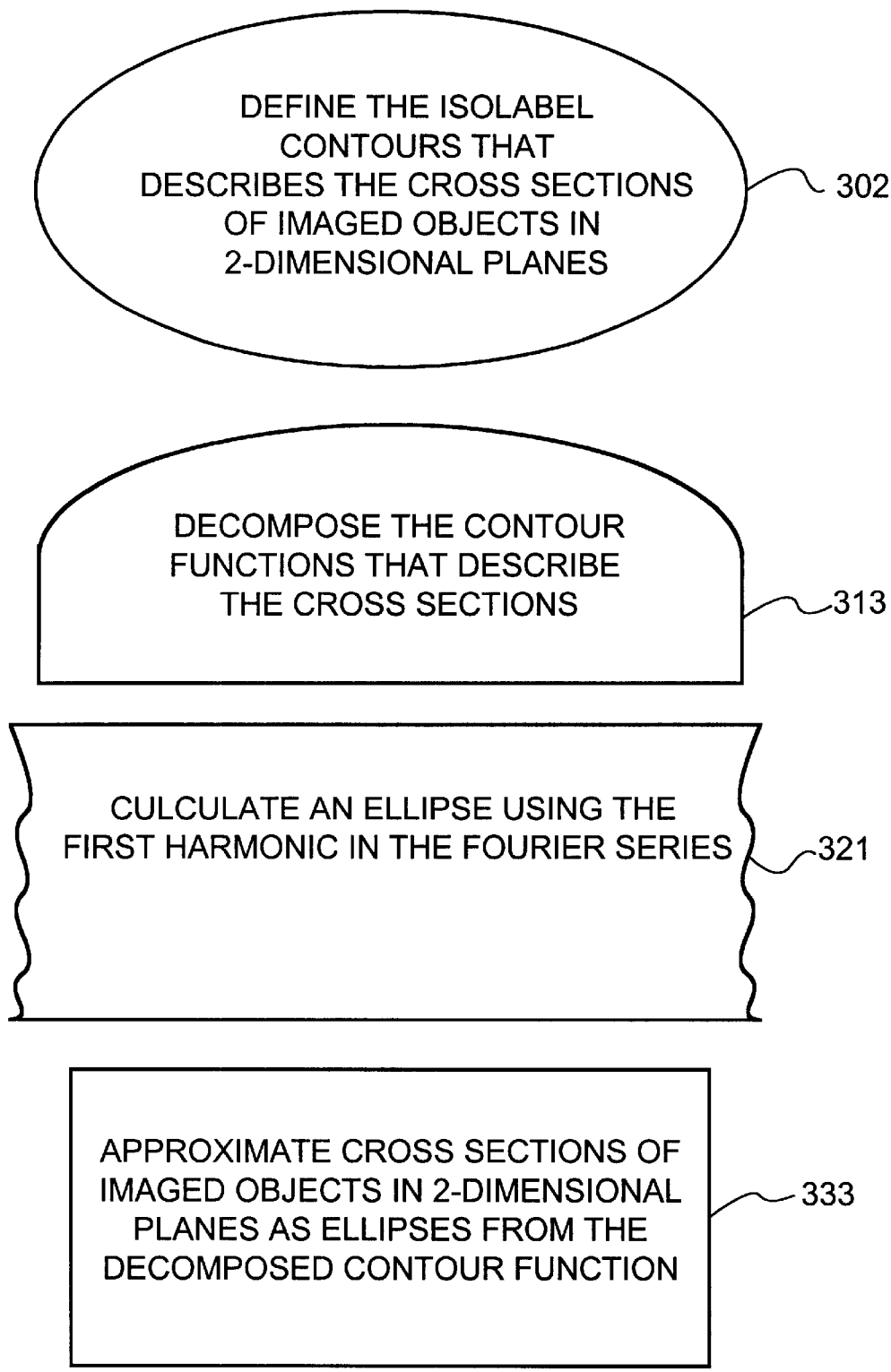
FIG. 10 is a flow diagram for generating elliptical approximations for the cross sectional areas of imaged object in 2-dimensional planes.

Referring to FIG. 10, the first step to grouping cross sections object images from parallel 2-dimensional planes of an image volume is to define the functions that describe the cross sectional areas of the object images 302. The function can be derived from contours generated by the method described above for designating object boundaries within 2-dimensional images. What is important to assure proper grouping of the object image cross sections is that the contour function is derived from a contour that correctly described the area of the cross section and the shape of the cross section.

Figure 11A:
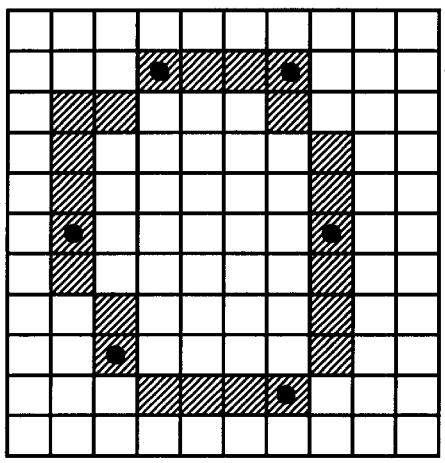
FIGS. 11a–c show how several groups of set points are chosen for a contour to generate pseudo contours.
Figure 11A:
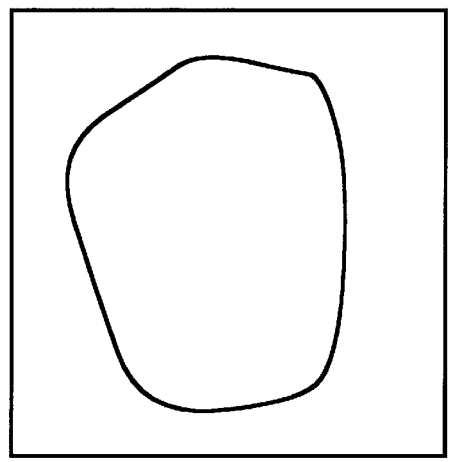
Figure 11B:
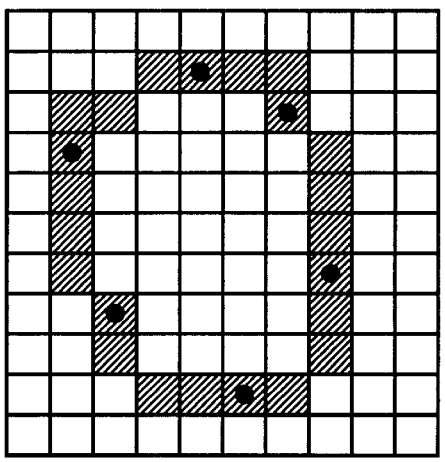
Figure 11B:
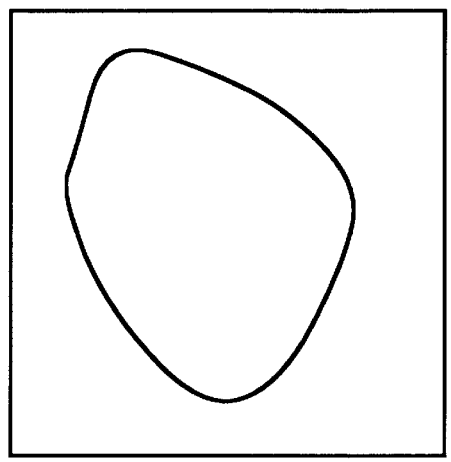
Figure 11C:
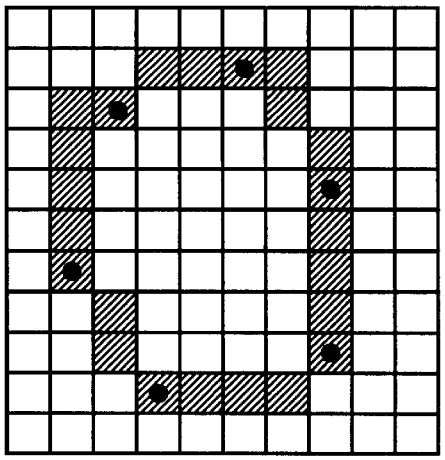
Figure 11C:
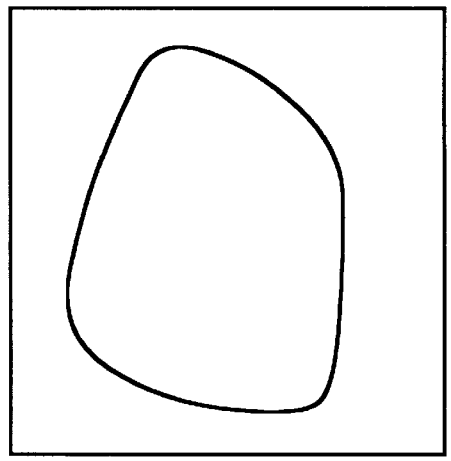
Figure 11D:
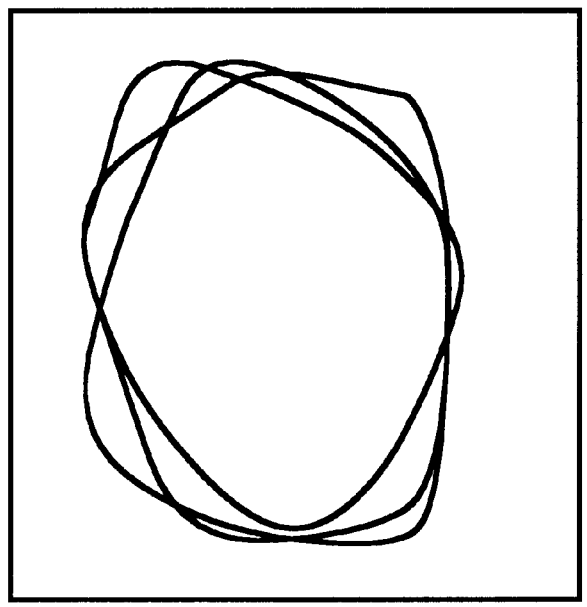
FIGS. 11d–e show the contour obtained from averaging the pseudo contours.
Figure 11E:
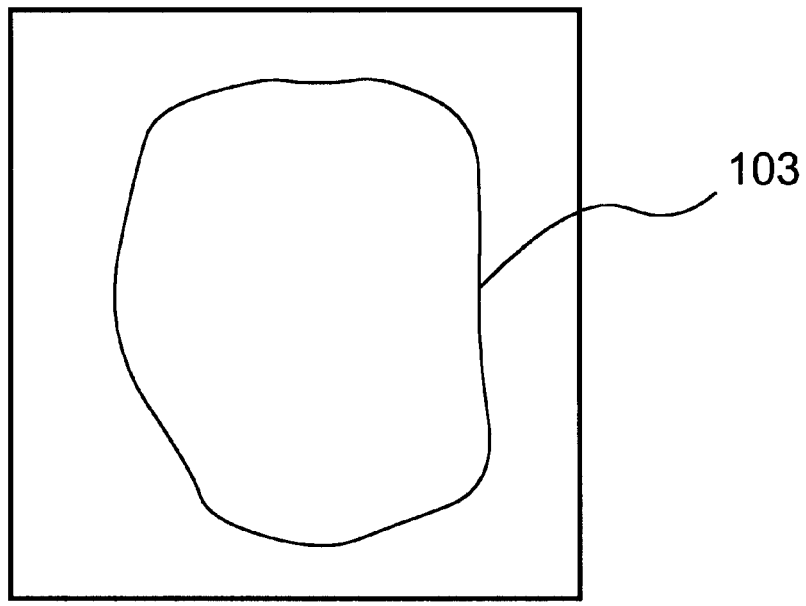

Referring to FIGS. 11a–c, a preferred method for generating functions to describe the cross sections of object images from 2-dimensional planes is to choose a set of control points for a contour that defines the boundary of the cross section within a 2-dimensional plane. The control points are then connected with a cubic spline approximation line to generate a pseudo contour. The process is iterated by choosing (n) sets of control points from the contour to generate (n) pseudo contours. Referring to FIG. 11d, the (n) pseudo contours are then averaged to generate a contour that represents the area and shape of the cross section of an object image in the 2-dimensional plane.

The contours that correspond to the cross-sections are then represented by a mathematical function that describes the shape of the cross sections. Generating the contours by this method is general and can be used at any point in the segmentation method where contours are manipulated.

Referring again to FIG. 10, the contour function is decompose into two orthogonal projections in the plane of the cross section using a Fourier Series 313. Using the first harmonic coefficient in the Fourier Series the projections describe a ellipse 321 that is used to approximate the area of the cross section of the object image 333.

Figure 12:
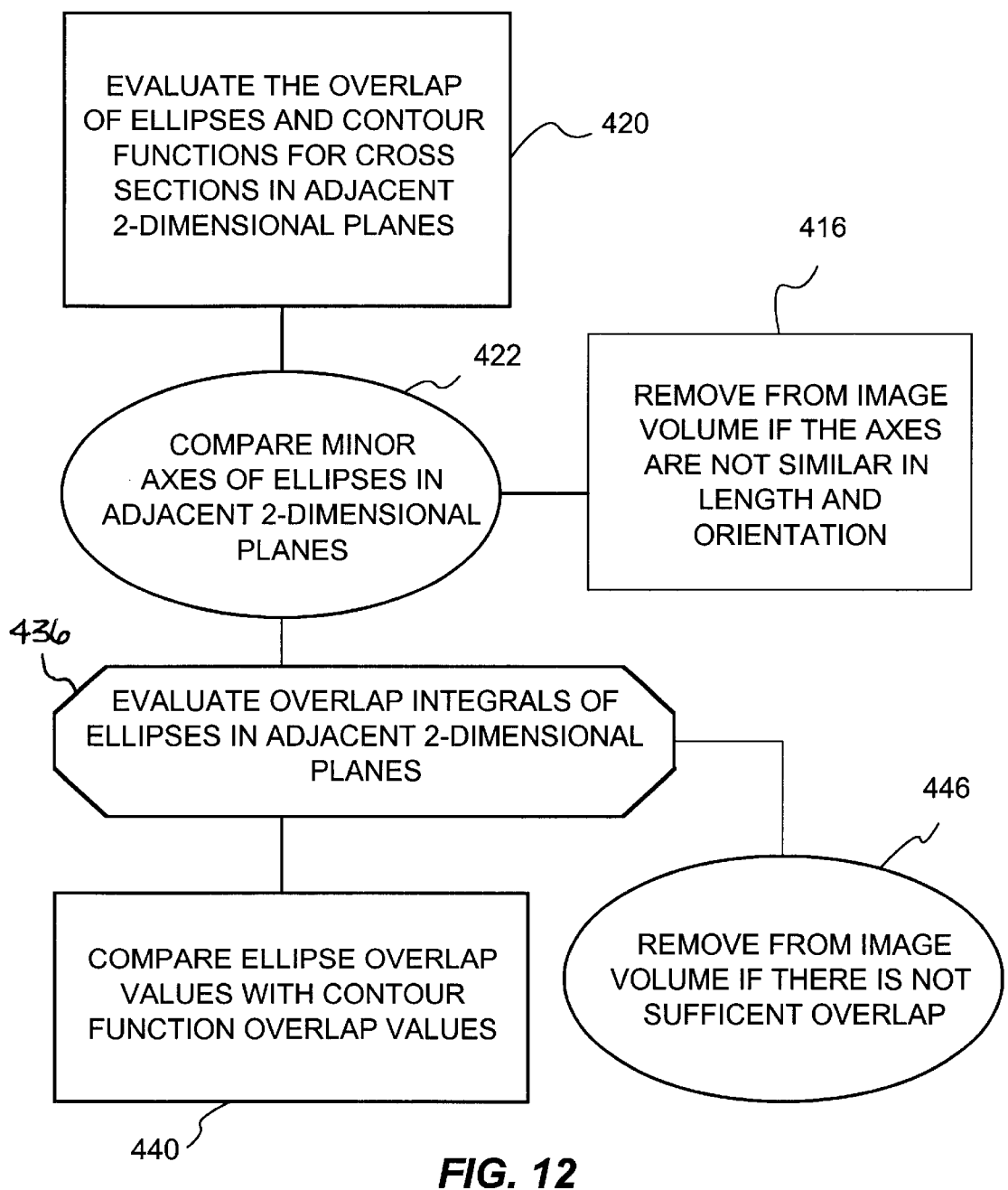
FIG. 12 is a flow diagram for grouping cross sections of imaged objects in parallel adjacent 2-dimensional planes of an FIG. 13 is a branched structure in a 3-dimensional image volume segregated by the method of this invention.
Figure 13:
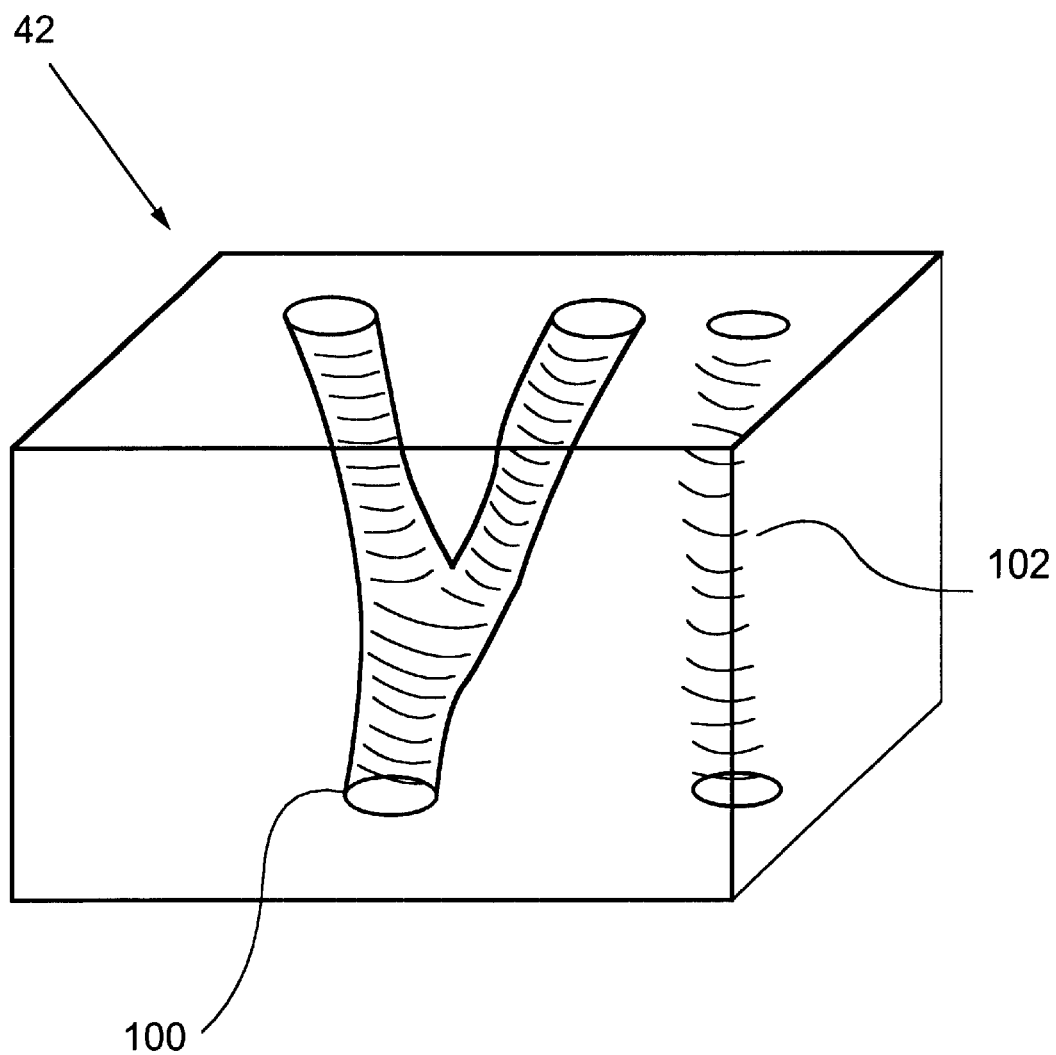

Referring to FIG. 12, grouping cross sections of object images in adjacent 2-dimensional planes of an image volume is accomplish by evaluating the overlap 156 of the ellipses and the contour functions for cross sections in the adjacent 2-dimensional planes and further evaluating if they should be grouped together based on an overlap criteria. As a prerequisite criteria, minor-axes of the ellipses in adjacent planes are compared 422. If the minor-axes of ellipses in adjacent parallel 2-dimensional planes are substantially the same length and have substantially the same orientation they potentially belong to the same object image and should be evaluated further. If this condition is not met the ellipses may be considered as not belonging to the same object image and may be removed from the image volume 416 or labeled to distinguish that it does not belong to the object image being segmented. A subsequent overlap criteria involves evaluating the overlap integrals of the ellipses in the direction normal to 2-dimensional planes 436. If the overlap integral is not sufficient the cross sections are label as not belonging to same object image or be edited out of the image volume 446. Once it is ascertained all the cross-section in the two dimensional planes that belong to objects images that are being segregated, the entire image volume can be edited to exhibit only the segregated object images as shown in FIG. 14.

Again referring to FIG. 12, further check and see if the model is correct, the overlap integral values from the ellipses are compared to the overlap valued of the functions or contours from which the ellipse where derived 440. For complex segmentation the method is extended to three orthogonal directions.

The method of this invention can be completely automated and does not require prior knowledge of the shapes of the object images. The method is particularly useful for segregating imaged vessel structures from an image volume.

What is claimed is:

1. A method of segmenting object images from a digitalized image comprising pixels, said method comprising:
    a) determining an intensity threshold that defines a substantial change in image intensity, wherein said determining an intensity threshold is a multi-level thresholding;
    b) generating a plurality of isolabel contours following a path of substantially constant image intensity and separated by said intensity threshold, whereby said contours enclose regions of said digitalized image;
    c) determining shapes of said isolabel contours comprising:
        1) choosing a set of control points within each image intensity threshold;
        2) connecting said set of control points with a cubic spline approximation line;
        3) choosing a second set of control points within said each image intensity threshold;
        4) connecting said second set of control points with a second cubic spline approximation to generate a pseudo isolabel contour;
        5) repeating steps 3) and 4) n times to generate n pseudo isolabel contours for each said image intensity threshold;
        6) averaging n pseudo isolabel contours to generate an isolabel contour; and
        7) calculating a turning angle sequence for each said isolabel contour to define the shape of said contour;
    d) comparing said shapes of said isolabel contours relative to each other; and
    e) labeling regions of said image enclosed by said isolabel contours of substantially similar shape and regions of said image that are not enclosed by isolabel contours of similar shape;
wherein said pixels that are bordered by the same isolabel contours are set to a common intensity label.

2. A method of segmenting an object image from an image volume containing a plurality of object images, said method comprising:
    a) acquiring a plurality of 2-dimensional images that represent imaged slices of said image volume, said slices being spaced at a predetermined distance;
    b) constructing said image volume from said plurality of 2-dimensional images;
    c) approximating cross-sectional areas of said plurality of object images as ellipses in a plurality of parallel 2-dimensional planes of said image volume, wherein said ellipses are constructed by steps comprising:
        1) defining an intensity threshold that defines a substantial change in intensity;
        2) prescribing functions that enclose said cross sectional areas;
        3) decomposing said functions into two orthogonal projections; and
        4) computing first harmonic coefficients of the Fourier series approximation for said two orthogonal projections for each of said functions to generate said ellipses;
    d) determining an area overlap criteria;
    e) calculating area overlaps of said ellipses from adjacent 2-dimensional planes in the direction normal to said plurality of parallel 2-dimensional planes; and
    f) labeling cross-sectional areas in said adjacent 2-dimensional planes meeting said overlap criteria as belonging to the same object image.

3. The method of claim 2 further comprising the steps of:
    a) computing areas enclosed by said functions and said ellipses for each cross sectional area;
    b) comparing computed areas of said functions and said ellipses;
    c) labeling said cross sectional areas with substantially different computed areas for said functions and said ellipses.

4. The method of claim 3 wherein said cross sectional areas having substantially different computed areas for said functions and said ellipses are labeled with zero image intensity.

5. The method of claim 3 wherein said area overlap criteria includes checking for ellipses in adjacent parallel 2-dimensional planes having minor-axes that are substantially the same length and orientation and therefore potentially belong to the same object image.

6. The method of claim 5 wherein said overlap criteria further comprises evaluation of overlap integrals, said method further comprising the steps of;
    a) calculating overlap integrals of said ellipses in said adjacent parallel 2-dimensional planes in said direction normal to said adjacent parallel 2-dimensional planes;
    b) labeling cross-sectional areas in said adjacent 2-dimensional planes with ellipses having substantial overlap integral values as belonging to the same object image;
    c) labeling cross-sectional areas in said adjacent 2-dimensional planes with small or zero overlap integral values as not belonging to the same object image.

7. The method of claim 6 wherein said overlap criteria further comprises comparing said overlap integrals of said ellipses in said adjacent parallel 2-dimensional planes in said direction normal to said adjacent parallel 2-dimensional planes with the overlap of said functions that enclose said cross-sectional areas wherein said overlap of said ellipses is an expected overlap value.

8. The method of claim 6 wherein said cross sectional areas having substantially smaller overlap areas for said functions than said expected overlap values are labeled with zero image intensity.

9. A method of segmenting an object image from an image volume containing a plurality of object images in said image volume, said method comprising;
   a) acquiring a plurality of 2-dimensional digitized images comprising Voxels that represent imaged slices of said image volume, said slices being spaced at a predetermined distance;
   b) segmenting object images in said plurality of 2-dimensional digitized images comprising Voxels, wherein said segmenting object images comprises:
      1) determining an intensity threshold that defines a substantial change in image intensity;
      2) generating a plurality of isolabel contours following a path of substantially constant image intensity and separated by said intensity threshold, whereby said contours enclose regions of said image;
      3) determining shapes of said isolabel contours comprising:
         i) choosing a set of control points within each image intensity threshold;
         ii) connecting said set of control points with a cubic spline approximation line;
         iii) choosing a second set of control points within said image intensity threshold;
         iv) connecting said second set of control points with a second cubic spline approximation to generate a pseudo isolabel contour;
         v) repeating steps c) and d) n times to generate n pseudo isolabel contours for each said image intensity threshold;
         vi) averaging n pseudo isolabel contours to generate an isolabel contour; and
         vii) calculating a turning angle sequence for each said isolabel contour to define the shape of said contour;
      4) comparing said shapes of said isolabel contours-relative to each other; and
      5) labeling regions of said image enclosed by said isolabel contours of substantially similar shape and regions of said image that are not enclosed by isolabel contours of similar shape;
   c) constructing said image volume from said plurality of 2-dimensional digitized images comprising Voxels;
   d) approximating cross-sectional areas of said plurality of object images as ellipses in a plurality of parallel 2-dimensional planes of said image volume;
   e) determining an area overlap criteria;
   f) evaluating the area overlaps of said ellipses from adjacent 2-dimensional planes in the direction normal to said plurality of parallel 2-dimensional planes;
   g) labeling cross-sectional areas in said adjacent 2-dimensional planes meeting overlap criteria as belonging to the same object image; and
   h) editing said imaged volume to contain said object image to be segmented.

10. A method of segmenting an object image from an image volume containing a plurality of object images in said image volume, said method comprising:
    a) acquiring a plurality of 2-dimensional digitized images comprising Voxels that represent imaged slices of said image volume, said slices being spaced at a predetermined distance;
    b) segmenting object images in said plurality of 2-dimensional digitized images comprising Voxels;
    c) constructing said image volume from said plurality of 2-dimensional digitized images comprising Voxels;
    d) approximating cross-sectional areas of said plurality of object images as ellipses in a plurality of parallel 2-dimensional planes of said image volume, wherein said ellipses are constructed by steps comprising:
       1) defining an intensity threshold that defines a substantial change in intensity;
       2) prescribing functions that enclose said cross-sectional areas;
       3) decomposing said functions into two orthogonal projections; and
       4) computing first harmonic coefficients of the Fourier series approximation for said two orthogonal projections for each said function to generate said ellipses;
    e) determining an area overlap criteria;
    f) evaluating the area overlaps of said ellipses from adjacent 2-dimensional planes in the direction normal to said plurality of parallel 2-dimensional planes;
    g) labeling cross-sectional areas in said adjacent 2-dimensional planes meeting overlap criteria as belonging to the same object image; and
    h) editing said imaged volume to contain said object image to be segmented.

11. The method of claim 10 further comprising the steps of:
    a) computing areas enclosed by said functions and said ellipses for each cross sectional area;
    b) comparing computed areas of said functions and said ellipses;
    c) labeling said cross sectional areas with substantially different computed areas for said functions and said ellipses.

12. The method of claim 11 wherein said cross sectional areas having substantially different computed areas for said functions and said ellipses are labeled with zero image intensity.

13. The method of claim 10 wherein said area overlap criteria includes checking for ellipses in adjacent parallel 2-dimensional planes having minor-axes that are substantially the same length and orientation and therefore potentially belong to the same object image.

14. The method of claim 13 wherein said overlap criteria comprises evaluation of overlap integrals, said method further comprising the steps of;
    a) calculating overlap integrals of said ellipses in said adjacent parallel 2-dimensional planes in said direction normal to said adjacent parallel 2-dimensional planes;
    b) labeling cross-sectional areas in said adjacent 2-dimensional planes with ellipses having substantial overlap integral values as belonging to the same object image;

c) labeling cross-sectional areas in said adjacent 2-dimensional planes with small or zero overlap integral values as not belonging to the same object image.

15. The method of claim 14 wherein said overlap criteria further comprises comparing said overlap integrals of said ellipses in said adjacent parallel 2-dimensional planes in said direction normal to said adjacent parallel 2-dimensional planes with the overlap of said functions that enclose said cross-sectional areas wherein said overlap of said ellipses is an expected overlap value.

16. The method of claim 14 wherein said cross sectional areas having substantially smaller overlap areas for said functions than said expected overlap values are labeled with zero image intensity.

* * * * *

UNITED STATES PATENT AND TRADEMARK OFFICE
CERTIFICATE OF CORRECTION

PATENT NO. : 6,424,732 B1
DATED : July 23, 2002
INVENTOR(S) : Shiffman et al.

Page 1 of 1

It is certified that error appears in the above-identified patent and that said Letters Patent is hereby corrected as shown below:

Column 1,
Line 11, please insert the following paragraph before "BACKGROUND ART",
-- STATEMENT REGARDING FEDERALLY SPONSORED RESEARCHED OR DEVELOPED
This invention was made with Government support under contract HL 50305 awarded by the National Institutes of Health. The Government has certain rights in the invention. --

Signed and Sealed this

Twenty-fourth Day of February, 2004

JON W. DUDAS
*Acting Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 6,424,732 B1 | |
| APPLICATION NO. | : 09/203299 | |
| DATED | : July 23, 2002 | |
| INVENTOR(S) | : Shiffman et al. | |

It is certified that error appears in the above-identified patent and that said Letters Patent is hereby corrected as shown below:

In the Specification, Column 1, line 11, above the heading "BACKGROUND", please insert:

-- FEDERALLY-SPONSORED RESEARCH OR DEVELOPMENT

This invention was made with Government support under contract HL050305 awarded by the National Institutes of Health. The Government has certain rights in this invention. --

Signed and Sealed this
Sixth Day of September, 2011

David J. Kappos
*Director of the United States Patent and Trademark Office*